United States Patent
Boyriven

[11] 3,742,781
[45] July 3, 1973

[54] ELECTRIC WINDOW OPERATING MECHANISM

[75] Inventor: Paul Boyriven, Paris, France

[73] Assignee: Compagnie Industrielle De Mecanismes, Courbevoie, France

[22] Filed: Oct. 1, 1971

[21] Appl. No.: 185,609

[30] Foreign Application Priority Data
Oct. 6, 1970 France.............................. 7035954
Jan. 29, 1971 France.............................. 7102945
Mar. 15, 1971 France.............................. 7108858

[52] U.S. Cl................................... 74/625, 74/425
[51] Int. Cl............................................. F16h 1/18
[58] Field of Search............................ 74/625, 425

[56] References Cited
UNITED STATES PATENTS
2,618,170  11/1952  Mulcahy.............................. 74/425
2,753,030  7/1956  Wight................................. 74/625
2,771,789  11/1956  Rossmann et al..................... 74/625
2,772,578  12/1956  Kling.................................. 74/625
3,372,607  3/1968  Lathrop et al...................... 74/625

FOREIGN PATENTS OR APPLICATIONS
783,432  4/1935  France.............................. 74/625

Primary Examiner—Charles J. Myhre
Assistant Examiner—Wesley S. Ratliff, Jr.
Attorney—Raymond A. Robic

[57] ABSTRACT

An electric window operating mechanism, for example for use on a road vehicle, comprises a worm and worm wheel speed reducer, the worm being connected to an electric drive motor, an operating axle of the mechanism extends through the worm wheel and a member is slideable along the axle by an auxiliary handle to declutch the speed reducer to enable the axle to be rotated and thus the window operated, by rotation of the handle in the event of breakdown of the electric drive, said member can be the worm wheel itself or can be separate therefrom.

11 Claims, 19 Drawing Figures

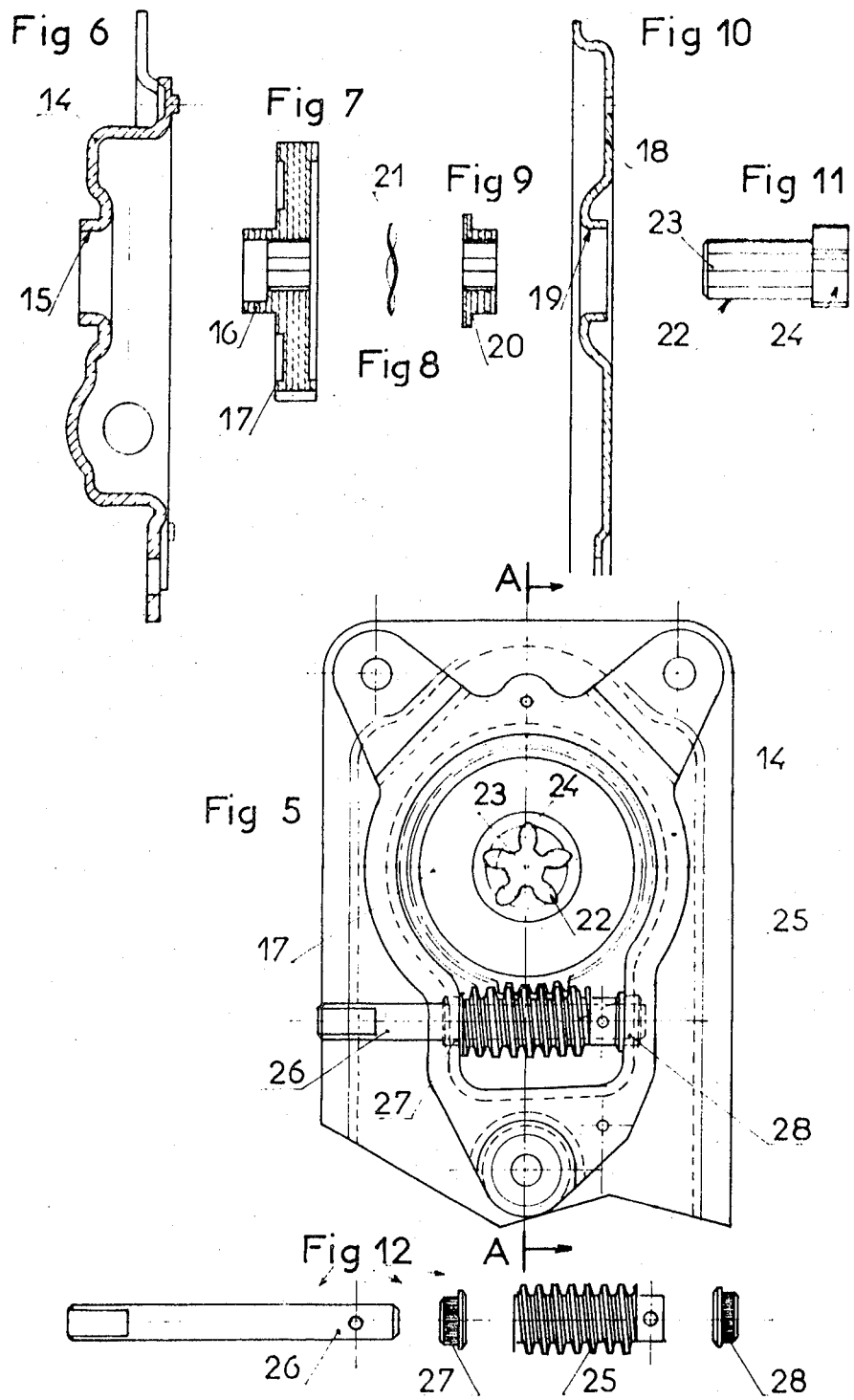

ELECTRIC WINDOW OPERATING MECHANISM

This invention relates to an electric window operating mechanism used, for example, for raising and lowering a window of a road vehicle.

It is an object of the present invention to provide an electric window operating mechanism which can be operated manually upon, for example, breakdown of the usual electric drive thereof.

Accordingly the invention provides an electric window operating mechanism comprising a speed reducer in the form of a worm and worm wheel, an axle co-axial with the worm wheel and a member rotatably connected to the axle but slideable therealong, against the influence of a spring, to de-clutch the speed reducer to allow manual rotation of the axle in the event, for example, of breakdown of the usual electric drive of the mechanism.

Preferably said member is the worm wheel itself and can be slid along the axle out of meshing relation with the worm to effect the de-clutching.

Alternatively the worm wheel has arcuate shaped teeth on its periphery and are permanently in meshing relation with the worm, said member being constituted by a separate spigot disposed between the wheel and the axle and slideable relative to both the wheel and the axle.

The invention will be described further, by way of example, with reference to the accompanying drawings, wherein:

FIG. 5 is a rear elevation of a second preferred embodiment of window operating mechanism conforming to the invention;

Figure 13:
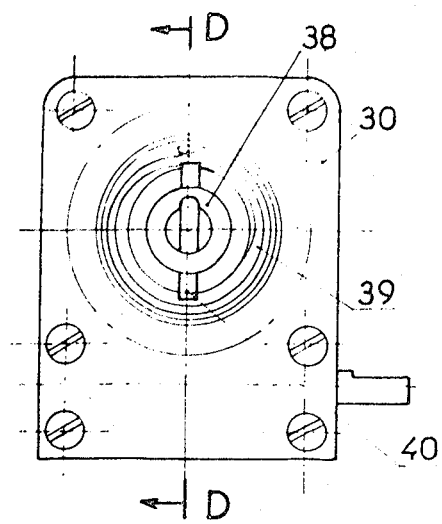
Figure 14:
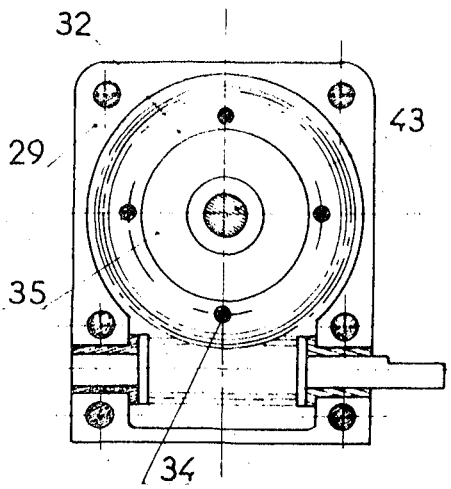
Figure 15:
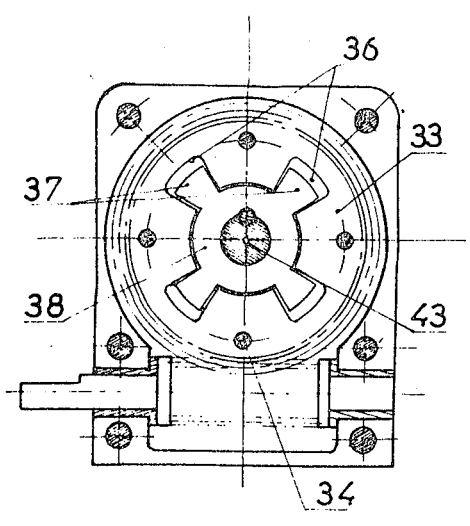
Figure 16:
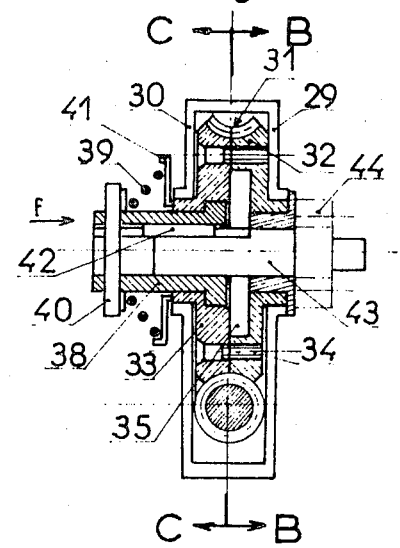
Figures 17, 18:
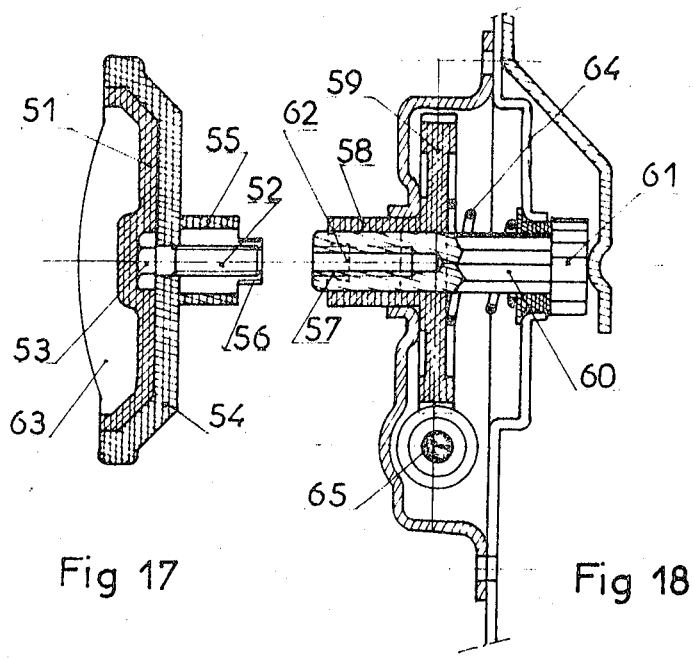
Figure 19:
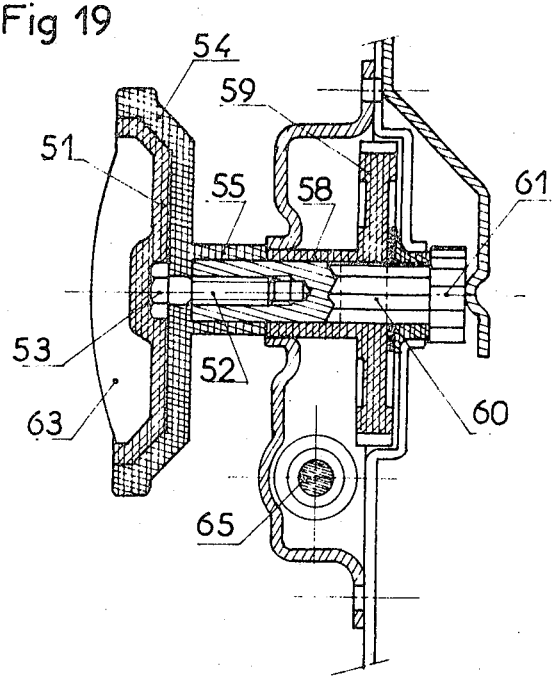

FIGS. 6 to 11 constitute an exploded sectional view on the line A—A of FIG. 5 and illustrate the underlisted parts of the mechanism of FIG. 5:

FIG. 6, a front casing part of the mechanism,
FIG. 7, a worm wheel of the mechanism,
FIG. 8, a spring washer of the mechanism,
FIG. 9, a centering bush of the mechanism,
FIG. 10, a rear casing part of the mechanism,
FIG. 11, a drive pinion of the mechanism and an axle of the mechanism;

FIG. 12 is an exploded view of a worm mounting of the mechanism of FIG. 5;

FIG. 13 is a rear elevation of a third embodiment of window operating mechanism conforming to the invention;

FIG. 14 is a view, partly in elevation and partly in section, taken on the line B—B of FIG. 16, and in the direction of the arrows B—B;

FIG. 15 is a view, similar to that of FIG. 14 but taken in the direction of the arrows C—C in FIG. 16;

FIG. 16 is a cross-section taken on the line D—D of FIG. 13;

FIG. 17 is a cross-section through a handle usable with the embodiment of FIG. 18;

FIG. 18 is a cross-section through a fourth preferred embodiment of electric window operating mechanism conforming to the invention and actuable in the event of breakdown, by the handle of FIG. 17;

FIG. 19 is a view similar to FIG. 18 but showing the handle of FIG. 17 engaged therewith.

Throughout the drawings only essential parts of the various window operating mechanisms have been illustrated and parts such as the usual electric motor and parts of the mechanism attached to the window have been omitted for the sake of clarity.

A first preferred embodiment of window operating mechanism is illustrated in FIGS. 1 to 4 and comprises a fixing plate 1 on which is fixed the customary trigger-guard 2, here adapted for centering and limiting the axial play of a pinion 3 which in known manner, drives a toothed sector (not shown) of the mechanism.

The pinion 3 is coaxial with and integrally formed with an axle which is formed with axially extending grooves. The number of grooves is the same as the number of teeth of the pinion 3. There have been represented five grooves, the pinion having five teeth, but any number of grooves and teeth can be provided according to the ratio of reduction, desired between the pinion and the toothed sector.

The mechanism comprises a speed reducer in the form of a worm 6, driven from an electric motor (not shown) meshing with a worm wheel 5. The worm wheel 5 has, at its centre an aperture which is profiled complementarily to the axle 4 after the manner of splines so as to be capable of driving the axle 4 and to be capable of sliding therealong. The wheel 5 has a central integral concentric spigot 7 which centres it in a stamped bearing 8 of its front casing part 9. The wheel 5 and its spigot at 7 are biased towards the left, in FIG. 3, by a tapered helical pressure spring 10 between the wheel 5 and a second collar bearing 11 centering the other end of the grooved axle 4. The wheel 5 and its spigot 7 as well as the bearing 11 can be made very economically by moulding, for example of plastics material such as a superpolyamide.

Figure 1:
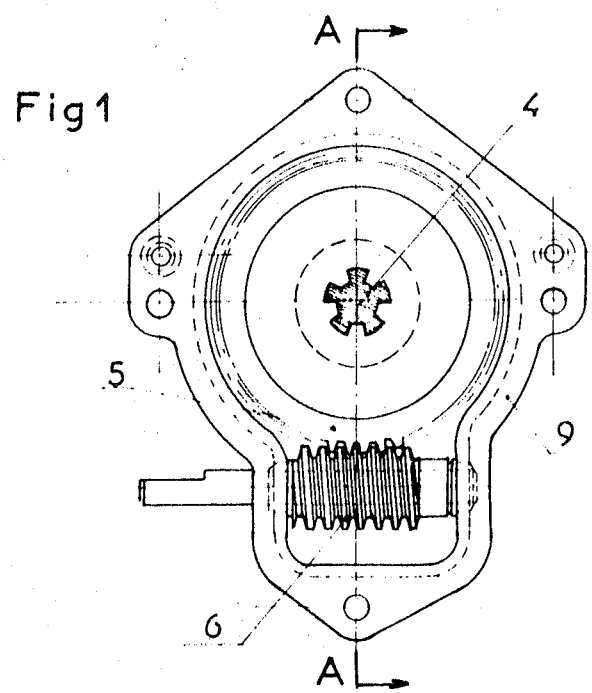
FIG. 1 is a rear elevation of a first preferred embodiment of window operating mechanism conforming to the invention.
Figures 2, 3, 4:
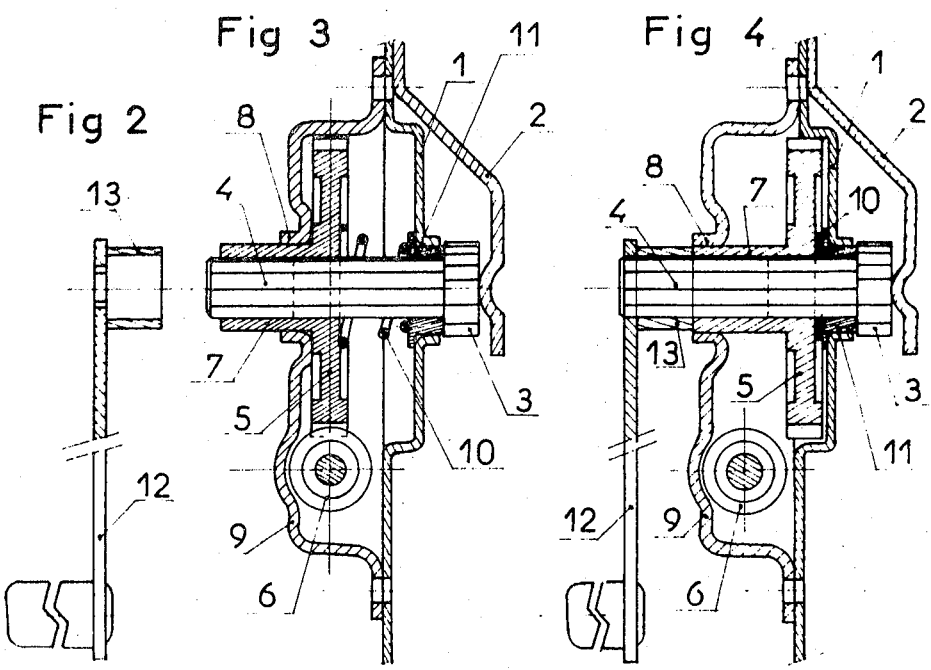
FIG. 2 is a schematic profile view, partly in section, of an auxiliary handle for use with the mechanism of FIG. 1.
FIG. 3 is a sectional view taken on the line A—A of FIG. 1.
FIG. 4 is a view comparable to FIG. 3 but showing the mechanism of FIG. 1 after insertion of the handle of FIG. 2.

Illustrated in FIG. 2 is an auxiliary handle 12 which may be used, for example in the event of breakdown of the electric operating system, to raise and lower the window. The handle 12 is of known construction except that it has a socket 13 which has an aperture profiled complementarily to the axle 4 so as to be slideable onto the grooved axle 4. As is shown in FIG. 4, pushing of the socket 13 onto the axle 4 pushes spigot 7 and thus wheel 5 to the right in FIG. 4 against the action of the spring 10 and so de-clutches the speed reducer by moving the wheel 5 clear of the worm 6.

When the socket 13 of the handle 12 has been inserted the mechanism can be actuated to open or close the window by manually rotating the handle 13. Upon withdrawal of the handle 13 the spring 10 once more urges the wheel 5 into engagemett with the worm 6.

FIGS. 5 to 12 illustrate a second preferred embodiment of window operating mechanism conforming to the invention and comprising a fixation plate in the form of a front casing part 14 of which a stamped flange 15 centres and forms a bearing for a spigot 16 of a worm wheel 17 and a rear casing part 18 comprises another flange 19 centering a shouldered bush 20 which forms a bearing for an axle 23. An elastic washer 21 is disposed between wheel 17 and bush 20. The axle 23 is grooved and this is formed from a bar of the same profile as a pinion 24 by reducing the diameter thereof over part of the length of the bar. Wheel 17 and bush 20 are formed with central apertures shaped complementarily to the axle 23 so that the wheel 17 can turn axle 23 and slide therealong and so that bush 20 can be turned in flange 19 to form a bearing for the axle 23.

As can be seen from FIG. 12 the worm 25 is mounted on a shaft 26 and keyed thereto by a pin (not shown). On each side of the worm 25 is disposed one of a pair of bushes 27, 28. The bushes 27, 28 are made from self-lubricating roasted or sintered bronze and fixed by being notched on the outside thereof and pressed into apertures in lateral walls of the front casing part 14. Operation of this embodiment is in all respects similar to the operation of the mechanism of the first embodiment.

In FIGS. 13 to 16, there is illustrated a third embodiment of mechanism conforming to the invention and comprising a speed reducer in the form of a worm and worm wheel 31. The wheel 31 has arcuate shaped teeth on its periphery, these teeth being complementary to the profile of the worm. The wheel 31 is composed of two half-wheels 32 and 33, assembled together by rivets 34. The half-wheels 32 and 33 can thus economically be made by moulding, for example of plastic material such as a superpolyamide. A central generally cylindrical cavity 35 is formed in half-wheel 32 and a cruciform cavity is formed centrally in half-wheel 33. A separately formed spigot 38 is slidably mounted in half-wheel 33 and has a cruciform end portion engageable with the cruciform cavity in the half-wheel 33. Spigot 38 can be moved to the right in FIG. 16, against the spring action of 39 interposed between a cotter-pin 40 and a support washer 41 to disengage from the cruciform aperture in half-wheel 33 and rotate freely in the aperture 35 to de-clutch the wheel 31 from the worm.

The cruciform end portion of spigot 38 can be disengaged from the cruciform cavity 36 of half-wheel 33 by pushing on an auxiliary handle, for example in the event of breakdown of the usual electric driver, in the direction of the arrow $f$ in order to compress the spring 39, due to the sliding of the socket 38. The spigot 38 has a key 42 which engages an internal slot or groove in axle 43 and thus is always in driving connection with the axle 43 but can slide therealong.

Thus, in this embodiment, the de-clutching of the speed reducer is effected not by moving the worm wheel from the worm but by disengaging the cruciform end portion of spigot 38 from the cruciform cavity in half-wheel 33. The wheel 31 is thus always in meshing relation with the worm; this gives a greater mechanical stability to the speed reducer.

Displacement of the spigot is, of course, effected by applying a socket of an auxiliary handle to the left hand end of spigot 38 to cause it to move to the right (in FIG. 16) the socket then engaging by a complementary key, with the slot or groove in axle 43 which can then be manually rotated by means of the inserted auxiliary handle in the event of breakdown of the usual electric drive of the mechanism.

A fourth embodiment of mechanism conforming to the invention is illustrated in FIGS. 17 to 19. In this embodiment an auxiliary handle of the mechanism (illustrated in FIG. 17) is in the form of a double knob comprising an inner knob port 51 economically moulded from plastics material. The port 51 comprises a threaded shaft 52 with a head 53 which is inserted therein at the time of moulding, whilst the body of this screw rotates freely in a central bore of a second outer knob port 54 which is likewise moulded from plastics material and which comprises a tubular collar 55.

The threaded shaft 52 can be retained longitudinally by a circlip or other clip at the left hand end of the collar 55. Collar 55 comprises at its free end two symmetrical lugs shaped to nest into corresponding gaps 57 of a spigot 58 integral with a worm wheel 59. The wheel 59 is formed with a central aperture which is profiled complementarily to a grooved axle 60 carrying a pinion 61, as in the first and second embodiments.

The grooved shaft 60 has a central bore 62 which is tapped complementarily to the threaded shaft 52 of the inner port 51. By screwing port 51 into the axle 60 with the lugs 56 nesting into the gaps in spigot 58 with the spigot 58 and wheel 59 can be moved to the right in FIG. 18 to de-clutch the worm wheel 59 from the worm 65. The spring 64 acts in the same way as the corresponding springs in the previous embodiments and opposes this movement. When the wheel 59 has been disengaged from the worm 65 the outer port 54 of the auxiliary handle can be rotated to turn the axle 60 and pinion 61 to raise or lower the window.

when inner port 51 is rotated to remove it from the mechanism spring 64 returns the worm wheel 59 to its position engaging the worm 65.

The invention is not limited to the precise details of the foregoing embodiments and variations may be made thereto within the scope of the following claims, by way of example, a spring 10, 21, 39, 64 can be used which is of a value such that the pressure which it exerts is less than that of the dislocation reaction of the worm wheel in relation to the worm, in the event of abnormal resistance. Thus, in this case, if the worm wheel should become jammed the force exerted on it by the worm can cause the worm wheel to disengage from the worm against the action of the spring, so lowering the possibility of damaging the mechanism.

It is also possible to provide a couple or torque limiter for de-clutching of the worm wheel and worm in the event of abnormal resistance.

It is possible to substitute for the worm wheel moulded integrally with its spigot, an assembly of a separately moulded wheel and spigot. The handle can simply comprise an opening in its flat arm shaped complementarily to the grooving of the axle 4 and there being attached therearound a simple soldered tube having its internal diameter circumscribing the opening. Many other variations are, of course possible.

I claim:

1. An electric window operating mechanism, comprising:
    a speed reducer in the form of a worm and a worm wheel;
    an axle co-axial with said worm wheel, said axle being axially grooved on its periphery;
    a member rotatably connected to said axle but slideable therealong, against the influence of a spring, to de-clutch the speed reducer to allow manual rotation of the axle in the event of breakdown of the usual electric drive of the mechanism.

2. An electric window operating mechanism, comprising:

a speed reducer in the form of a worm and a worm wheel, said wheel having a spigot extending from one of its sides;

an axle co-axial with said worm wheel, said axle having a plurality of grooves extending longitudinally on the periphery of said axle;

said wheel having a central aperture profiled complementarily to said axle so as to be rotatable with said axle but slideable on said axle, against the influence of a spring, to de-clutch the speed reducer to allow manual rotation of the axle in the event of breakdown of the usual electric drive of the mechanism.

3. A mechanism as claimed in claum 2, in combination with an auxiliary handle, the handle comprising a collar and an aperture concentric with the collar and of similar profile to that of the aperture in the wheel so that the collar of the handle can be pressed against the spigot to effect the sliding of the worm wheel, and the aperture in the handle can engage the axle to enable it to be manually rotated.

4. An electric window operating mechanism, comprising:

a speed reducer in the form of a worm and a worm wheel;

an axle co-axial with the worm wheel, said axle being axially grooved on its periphery;

said worm wheel being rotatably connected to said axle but slideable therealong, against the influence of a spring, out of meshing relation with said worm to de-clutch the speed reducer to allow manual rotation of the axle in the event of breakdown of the usual electric drive of the mechanism;

said axle having a treaded axial bore in one end thereof to enable an auxiliary handle to be screwed on said axle to effect said sliding of said worm wheel.

5. A mechanism according to claim 4, in combination with an auxiliary handle, said handle comprising:

an inner port having a threaded shaft extending therefrom;

an outer port having a collar theron co-axial with said shaft;

said collar having lugs extending therefrom for nesting in complementary gaps in a spigot of said wheel, so that said inner port can be rotated to screw its shaft into said bore in said axle and cause said collar to contact said spigot of said wheel and so move the wheel out of meshing engagement with said worm, said outer port then being manually rotatable to turn said axle.

6. An electric window operating mechanism, comprising:

a speed reducer in the form of a worm and a worm wheel;

an axle co-axial with said worm wheel, said axle being axially grooved on its periphery;

a casing comprising two casing parts, each provided with a central flange, said flanges providing guide bearings for the said axle and said worm wheel;

said worm being mounted on a shaft journalled in two bushes spaced one on each side of the worm, said bushes being notched on their outsides and being pressed into apertures in said casing;

said axle having a shouldered bush thereon provided with a central aperture profiled complementarily with said axle and located in one of the flanges of the housing;

said wheel having a central aperture profiled complementarily to said axle so as to be rotatable with said axle but slideable on said axle to de-clutch the speed reducer to allow manual rotation of the axle in the event of breakdown of the usual electric drive of the mechanism.

7. An electric window operating mechanism, comprising:

a speed reducer in the form of a worm and a worm wheel, said worm wheel having arcuate shaped teeth on its periphery and being permanently in meshing relation with said worm;

an axle co-axial with said worm wheel;

a spigot disposed between said wheel and said axle, said spigot being slideable relative to both said wheel and said axle;

said spigot having an end portion which is cruciform;

said wheel being constituted by two half-wheels fastened together, one of said half-wheels being provided with a central cruciform cavity, and the other of said half-wheels being provided with a generally cylindrical cavity, the sliding of said spigot causing its cruciform end portion to engage or disengage with the cruciform cavity of said wheel so as to clutch or de-clutch the speed reducer.

8. A mechanism as claimed in claim 7, wherein there is a compression spring disposed between a pin and a support washer, said pin and support washer being mounted on said spigot, and wherein said spigot is spring biased into engagement with the cruciform cavity by means of said compression spring.

9. A mechanism as claimed in claim 7, wherein the half-wheels are moulded from synthetic plastics material to obviate the need for machining.

10. A mechanism as claimed in claim 1, characterized in that the axle has an integral pinion at one end thereof, the axle and pinion having been made from a bar of the same cross-section as the pinion by reducing the diameter of a part of the length of the bar, the grooves in the bar being thus equal to the number of teeth on the pinion.

11. A mechanism as claimed in claim 1, wherein the pressure of the spring is lower than that force which arises at the worm when rotation of the worm wheel is impeded so that when the force tending to urge the worm wheel off the worm reaches the value of the pressure of the spring the worm wheel is displaced off the worm against the pressure of the spring so avoiding straining of the mechanism.

* * * * *